US008152337B2

(12) United States Patent
Herms et al.

(10) Patent No.: US 8,152,337 B2
(45) Date of Patent: Apr. 10, 2012

(54) ELECTRONIC DISPLAY PANEL (75) Inventors: Richard Alan Herms, Loomis, CA (US); Stanley Robert Warwarick, Rancho Cordova, CA (US); Hendrick Philip Van Rensselaer, Auburn, CA (US)

(73) Assignee: Billboard Video, Inc., Corona, CA (US)

( * ) Notice: Subject to any disclaimer, the term of this patent is extended or adjusted under 35 U.S.C. 154(b) by 350 days.

(21) Appl. No.: 12/434,607

(22) Filed: May 1, 2009

(65) Prior Publication Data
US 2010/0277915 A1    Nov. 4, 2010

(51) Int. Cl.
*F21V 29/00* (2006.01)
*G09F 21/04* (2006.01)

(52) U.S. Cl. .......... 362/294; 362/373; 362/486; 40/591; 361/690

(58) Field of Classification Search .............. 362/294, 362/373, 486, 540, 559, 812; 40/541, 591; 361/690
See application file for complete search history.

(56) References Cited

U.S. PATENT DOCUMENTS

| 5,555,163 | A | 9/1996 | Pisani |
| 5,570,525 | A | 11/1996 | Paglieri et al. |
| 5,624,181 | A | 4/1997 | Miller et al. |
| 5,808,417 | A | 9/1998 | Ference |
| 5,949,581 | A | 9/1999 | Kurtenbach |
| 5,990,802 | A | 11/1999 | Maskeny |
| 5,993,027 | A | 11/1999 | Yamamoto et al. |
| 6,046,550 | A | 4/2000 | Ference et al. |
| 6,065,854 | A | 5/2000 | West et al. |
| 6,379,209 | B1 * | 4/2002 | Tucker ........................ 445/24 |

(Continued)

FOREIGN PATENT DOCUMENTS
EP    1 637 330    3/2006
(Continued)

OTHER PUBLICATIONS

Copenheaver, Blanc R.; Transmittal of International Search Report and Written Opinion mailed on Jul. 7, 2010 in Applicants' co-pending PCT International Application No. PCT/US2010/033371.

(Continued)

*Primary Examiner* — Peggy A. Neils
(74) *Attorney, Agent, or Firm* — Vic Lin; Innovation Capital Law Group, LLP (57) ABSTRACT A multi-panel electronic display for use on a structure, comprising a frame removably attached to the structure in such a way as to encounter a natural airflow, a plurality of individual panels mounted on the frame, each panel comprising a first side and a second side opposite the first side, the first side comprising a plurality of light sources, wherein each individual panel works with other individual panels to display an image, and a printed circuit on the second side of more than one of the individual panels of the multi-panel electronic display and in thermally conductive communication with the frame such that heat generated by electronic components on the circuit board is dissipated within the frame and such that the frame is cooled by the natural airflow. The frame may be corrugated to facilitate dissipation of the heat and create space for electrical wiring, and thermally conductive pads may be inserted between the circuit board and the frame to further dissipate heat. A 12 volt, 24 volt, or greater power source can be stepped down to 5 volts on the panel itself, outside the structure, to minimize holes needed in the walls of the structure.

21 Claims, 4 Drawing Sheets

U.S. PATENT DOCUMENTS

| | | | |
|---|---|---|---|
| 6,628,074 | B1 | 9/2003 | Saito et al. |
| 7,038,398 | B1 | 5/2006 | Lys et al. |
| 7,191,506 | B2 | 3/2007 | Gray et al. |
| 7,196,459 | B2 | 3/2007 | Morris et al. |
| 7,407,306 | B2 | 8/2008 | DeMarb et al. |
| 7,438,450 | B2 * | 10/2008 | Aoki et al. .................... 362/373 |
| 7,598,686 | B2 * | 10/2009 | Lys et al. ...................... 315/312 |
| 2004/0255496 | A1 | 12/2004 | Youn |
| 2005/0001433 | A1 * | 1/2005 | Seelin ............................ 290/44 |
| 2006/0039884 | A1 | 2/2006 | Pawlenko |
| 2006/0290875 | A1 | 12/2006 | Shives |
| 2007/0008259 | A1 | 1/2007 | Barker |
| 2008/0094323 | A1 | 4/2008 | Sirmon et al. |
| 2008/0215415 | A1 | 9/2008 | Willms |
| 2009/0019748 | A1 | 1/2009 | Rosarius |
| 2010/0212198 | A1 * | 8/2010 | Matsunaga et al. ............. 40/564 |
| 2011/0072697 | A1 * | 3/2011 | Miller ............................ 40/564 |

FOREIGN PATENT DOCUMENTS

| | | |
|---|---|---|
| GB | 22402205 | 12/2004 |
| GB | 2449109 | 11/2008 |
| JP | 10123981 | 5/1998 |
| MX | 2007/002150 | 5/2007 |
| WO | WO 2006/021788 | 3/2006 |
| WO | WO 2008/139174 | 11/2008 |

OTHER PUBLICATIONS

Lee, Jong-Suk (James); International Preliminary Report on Patentability mailed on Aug. 9, 2011 in Applicants' co-pending PCT International Application No. PCT/US10/33371.

* cited by examiner

ELECTRONIC DISPLAY PANEL

TECHNICAL FIELD

This invention relates to electronic display panels, in particular, dynamic light emitting diode (LED) displays or liquid crystal displays (LCD) that efficiently dissipate heat.

BACKGROUND

The advertising industry has adopted dynamic advertisement displays. Rather than displaying a single static poster or image, a single dynamic advertisement display is capable of displaying a sequence of several different images. This offers several new conveniences and options for the industry, including ease of switching from one image to another with little or no expended manpower as well as allowing for new models for sharing advertiser time. Such dynamic advertisement displays involve electronic display boards utilizing light emitting diodes (LED), liquid crystal displays (LCD), and the like.

Typically, in order to protect the electronics for such displays from the environment, the electronic components are placed inside a housing or inside the structure or vehicle upon which the display is mounted. The electronic components that drive such electronic displays, however, can generate a substantial amount of heat that needs to be dissipated to insure optimal performance of the electronic display. One current method for dissipating heat associated with electronic displays includes using cooling fans to force cooling air into or around the housing to cool the electronic components.

Where the display is mounted to a moving vehicle the heat generating components usually are sealed in a housing that takes up space within the vehicle. The heat-generating components usually include, among other components, the voltage converter which converts the 24 volts from the vehicle battery to 5 volts, which is the typical voltage used by such printed circuit boards. This arrangement, however, usually requires the use of several large-diameter cables that pass through one or more large holes formed in the walls of the vehicle.

There is a need therefore for an electronic display that overcomes these deficiencies and similar obstacles that arise from these deficiencies.

SUMMARY

The present invention is directed to an electronic display that does not require a cooling fan to cool electronic components, but rather utilizes natural airflow that passes by the display to cool the electronic components. The electronic display comprises a frame attached to a static structure or moving vehicle in such a way as to encounter a natural airflow, a plurality of individual panels mounted on the frame. The front of each panel comprises a plurality of light sources that, together with light sources on other individual panels, display an image. The back of each panel comprises a printed circuit that contains one or more heat-generating electronic components. The panels or at least the heat-generating components are in thermally conductive communication with the frame such that heat generated by the electronic components on the circuit board is drawn away from the display and dissipated within the frame. The frame is then cooled by the natural airflow it encounters.

In some embodiments, the frame is corrugated or formed into a waffle-like pattern to improve natural airflow efficiency.

In some embodiments, a thermally conductive pad is placed between the electronic components and the frame and/or between the frame and the structure to improve the heat dissipating capacity of the combination.

In some embodiments, the power source has a potential greater than 5 volts.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

One impetus for the present invention was to come up with a dynamic display configuration that minimizes the interference with and consumption of space within the structure or vehicle on which the display is mounted. In order to achieve this, the voltage converter 142 and voltage regulator 144 were moved to the outside of the structure or vehicle 102. This created a number of new problems, including how to reduce or remove the housing that enclosed these heat-generating components.

In one embodiment of the present invention, the voltage converter 142 and voltage regulator 144 were replaced by several smaller converters and regulators which were distributed across the frame 126 of the display 100. The frame 126 was then formed into a corrugated pattern which improved the heat sinking characteristics of the frame 126. Thermally conductive pads 138 were then used to increase the transfer of heat from the heat-generating components 142-150 to the frame 126. This configuration utilized the natural airflow that passes by the display 100 and frame 126 to cool the electronic components and thereby reduced or eliminated the need for a cooling fan to cool the electronic components or to redirect cooling or conditioned air through the inside of the display.

In one embodiment, a multi-panel electronic display 100 comprises a plurality of individual display panels 110 mounted on the frame 126. The front side 112 of the panel 110 comprises a plurality of light sources 104 that, together with a plurality of light sources 104 on other individual panels 110, displays a sequence of advertising images. A printed circuit board 116 is attached to the back side of two or more of the individual panels 110 of the multi-panel electronic display 100 and is in thermally conductive communication with the frame 126 such that heat generated by the electronic components on the circuit board 116 is drawn away from the display 100 and dissipated within the frame 126. The frame 126 is then cooled by the natural airflow it encounters. To optimize the distribution of these heat-generating components 142-150, such a printed circuit board 116 can be attached to the back of each of the individual panels 110 and thermally coupled to the frame 126 by situating conductive pads 138 between the printed circuit board 116 and the frame 126 and/or between the electronic components and the frame 126.

These smaller heat-generating components 142-150 may be distributed across the frame 126 in spaced relationship so that the heat generated by these components is likewise distributed throughout the frame 126. This way, the heat is better removed by using the entire dimension of the frame 126 as a heat sink that is then cooled by natural airflow or by thermally coupling the frame to the surface material of the structure or vehicle 102. The structure 102 to which the display 100 is mounted can be a building, a billboard, or the like, or a moving vehicle.

Figure 1:
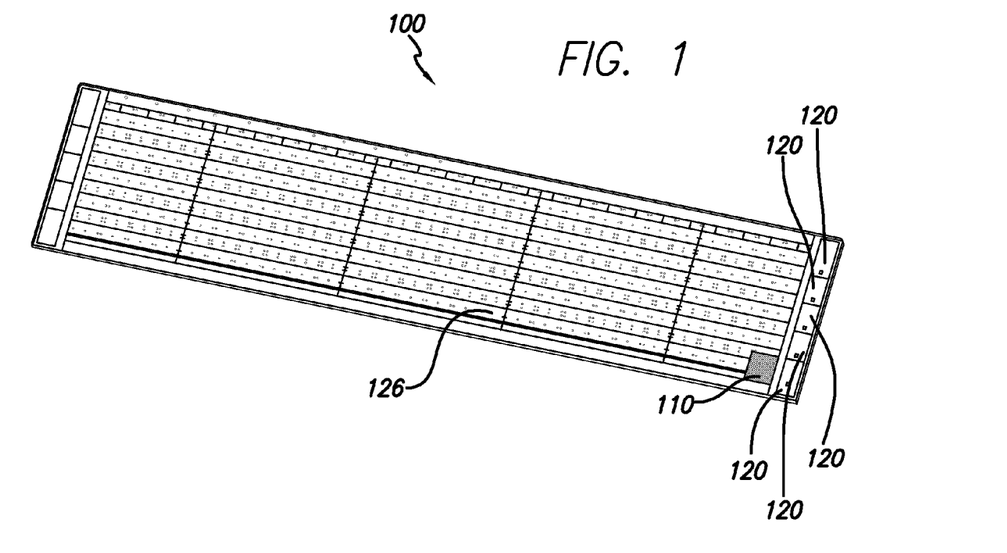
FIG. 1 shows a perspective view of an embodiment of the frame with all but one of the individual panels removed.

Referring to FIG. 1, one such multi-panel display 100 comprises a plurality of individual panels 110, each panel 110 having a plurality of energy-efficient light sources 104 on a first side 112. The opposite side 114 comprises a printed circuit board 116 with electronic components involved in powering and selectively activating the energy-efficient light sources 104 to display an image.

The individual panels 110 in the illustration are generally rectangular or square in shape comprising a plurality of light sources 104 arranged in a generally rectangular or square array, but other panel configurations are equally contemplated in the present invention. Suitable light sources include, but are not limited to, light emitting diodes (LED), liquid crystal displays (LCD), or the like. Preferably, the energy-efficient light sources are LEDs.

The individual panels 110 function as modular devices arranged in an array in the display 100. On the opposite side of the LED is a printed electronic circuit board 116. A circuit board 116 may be attached to the back side of more than one of the individual panels 110 of the multi-panel LED display 100, all of the individual panels 110, or some combination in between. One benefit to be obtained from this configuration is to distribute the heat-generating components 142-150 across at least a portion of the frame 126. Where the display 100 is used on a moving vehicle 102, this distribution may be concentrated near the leading edge of the display 100, along certain ridges 128 of the frame 126, or spread more evenly throughout the entirety of the frame 126. Where the display 100 is used on a static structure 102, such as a building, this distribution may be concentrated near the top edge of the display 100 or, again, spread more evenly throughout the entirety of the frame 126. This relatively better distributed heat is then more efficiently carried away from the display 100 through the frame 126.

Another benefit from this arrangement is that both the number and size of the cables or wires 124 capable of effectively delivering the power to the display 100 are greatly reduced, which in turn greatly reduces the number and size of the penetrations through the walls of the structure or vehicle 102. That is, the conversion from the 12 or 24 volts of a typical vehicle battery and certain commercially available electrical generators to the 5 volts that the LED displays operate on can be moved to the back side of the individual LED panels 110. The size of the cables that delivers 12 or 24 volts can be significantly smaller than those needed to deliver the 5 volts over even short distances. Additionally, since the 24 volt potential can be maintained over longer distances, a single 24 volt cable can deliver this voltage to a plurality of the circuit boards 116. Thus, the number and size of the power delivering cables 124 is greatly reduced, and the number and size of the holes that must be punched into the walls of the structure or vehicle 102 is as a consequence eliminated or greatly reduced.

The circuit board 116 is controlled by a processor 146 to coordinate the selective activation of individual LEDs and panels 110 so as to display an aggregate image or message. In addition, in some embodiments, each panel 110 can display images and messages independent of other panels 110. Thus, multiple different messages or advertisements can be displayed on a single multi-panel display 100.

Figure 4:
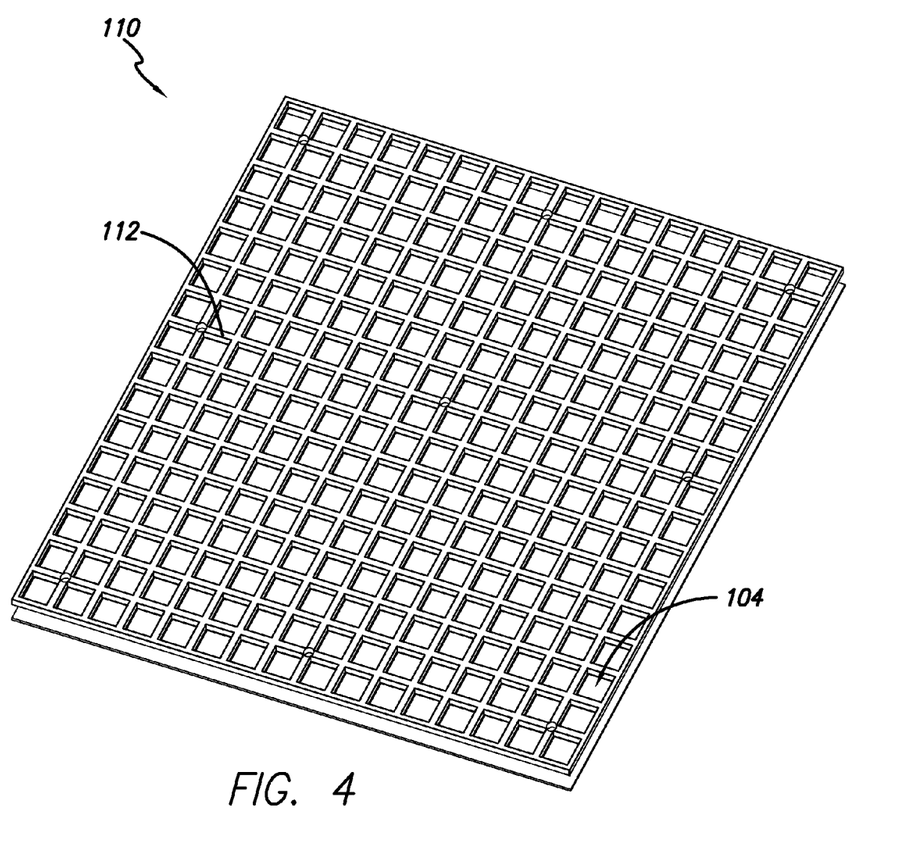
FIG. 4 is a perspective view of the front of an embodiment of an individual panel.
Figure 5:
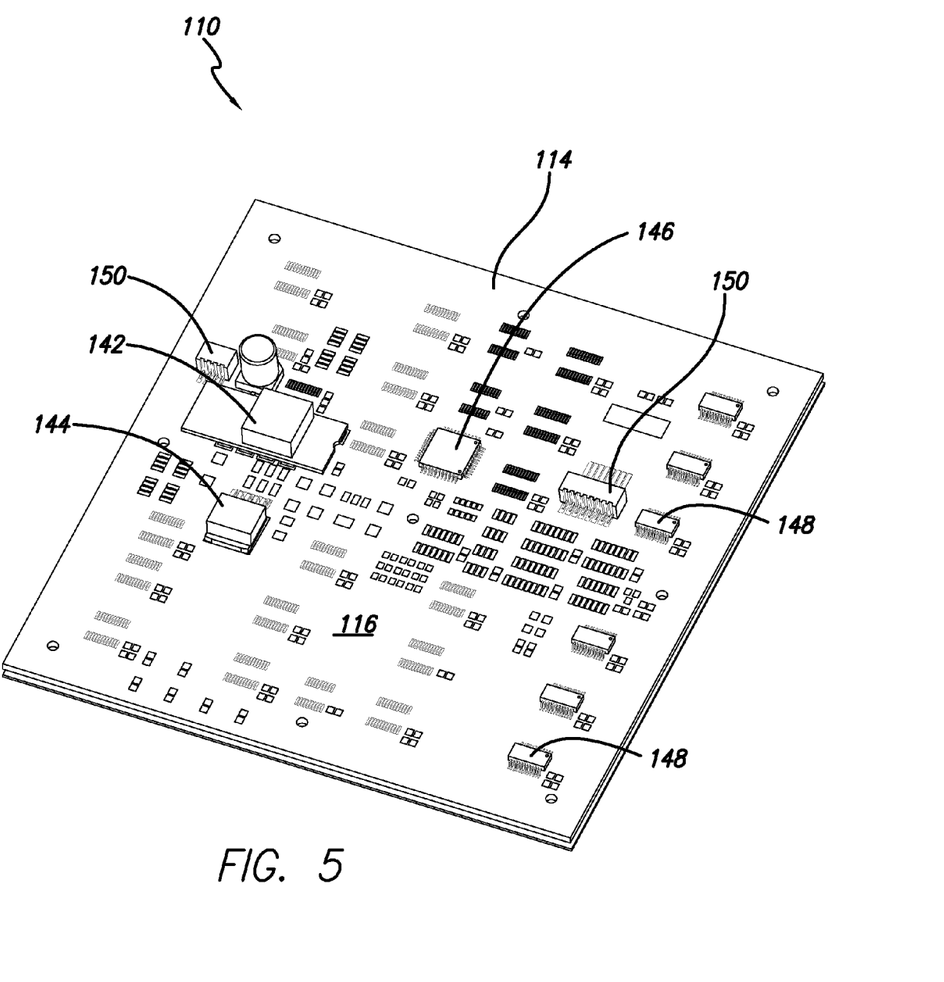
FIG. 5 is a perspective view of the back of the individual panel shown in FIG. 4.

In one example, as illustrated in FIG. 1, the multi-panel display 100 may comprise 130 individual panels arranged in an array of 26 columns and 5 rows. Each individual panel 110, as illustrated in FIG. 4, in turn may comprise 256 bundles of LEDs arranged in an array of 16 columns and 16 rows. The present invention, however, equally contemplates other configurations comprising greater or smaller numbers of individual panels 110 and LEDs within each panel 110.

One or more data distribution boards 120 may also be controlled by a microprocessor or other programmable logic device 146 to coordinate the selective activation of the panels 110 and individual LEDs to form and aggregate the display 100. Preferably, the data distribution board 120 is also located outside the structure 102. The data distribution board 120 may comprise additional heat-generating components 142-150 or these additional heat-generating components 142-150 may also be distributed throughout the plurality of individual panels 110 as discussed above.

In the preferred embodiment, the multi-panel display 100 utilizes DC power from a battery 122, such as the battery utilized by the vehicle 102. The battery 122 may have a potential greater than the approximately 5 volts that is typically necessary to operate the individual LED panels 110. More preferably the potential of the battery 122 is at least approximately 12 or 24 volts, such as in standard vehicle batteries. Although only 5 volts is required to power electronic components, in one embodiment, the higher voltage of the power source 122 can be directly connected to the panels 110 of the multi-panel display 100 without first remotely stepping the voltage down. The voltage can then be stepped down to 5 volts using a DC-DC power converter 142 on the circuit board 116 on the back side of each LED panel 110.

By delivering the higher voltage of the power source 122 directly to the individual circuit boards, the conductive cables or wires 124 that deliver this voltage can be fewer in number and thinner in size, in which each wire or cable 124 can drive more of the display panels 110. The use of thinner wires 124 may afford the option of directing the wire 124 around the wall of the structure or vehicle 102 thereby eliminating the need for punching any holes in the wall. Alternatively, at a minimum, such small wires 124 decrease the size of the holes that need to be created in the wall in order to pass the wire 124 from inside, where the power source 122 is located, to the outside, where the display 100 is located.

The electronic components include DC-DC power converters 142 to change the voltage of the power source 122 to a useable voltage, voltage regulators 144 to maintain the proper voltage during use, certain programmable logic devices 146 to selectively direct the LEDs, and LED drivers 148 to transmit to the individual LEDs. These electronic components generate significant amount of heat that can cause negative effects on the electronic components, including component failure. A common method of dissipating large amounts of heat produced by electronic components is to use a fan to blow the heat away or to direct cooled or conditioned air from the inside of the structure or vehicle. The use of a fan, however, requires additional energy and creates some heat in itself.

Airflow around the heat-generating components 142-150 can be increased without the use of additional energy-consuming fans by placing these electronic components outside the structure 102. In addition, distributing the heat generated by these electronic components over more than one of the panels 110 of the multi-panel LED display 100 improves the efficiency and efficacy of heat dissipation by increasing the amount of frame 126 (and optionally structure 102) through which the heat can be drawn and increasing the surface area over which airflow can be used to further remove this heat.

Placing the heat-generating components 142-150 outside the structure 102 exposes the heat generated by these components to natural airflow to facilitate removal of the heat through the convection process saving energy and space. In embodiments where the structure 102 is a vehicle, movement of the vehicle 102 creates additional natural airflow (i.e. airflow without the consumption of additional energy than that required to mobilize the vehicle 102) to further improve heat removal from the heat-generating components 142-150 by the natural convection from the airflow the vehicle 102 encounters as it moves.

In an embodiment of the present invention, the multi-panel display 100 with its associated circuit boards 116 may be mounted on a frame 126 that facilitates the heat sinking and air convection processes. Preferably, the frame 126 comprises a metal, such as aluminum.

In some embodiments, the printed circuit board 116 may be in thermally conductive communication with the frame 126 such that heat generated by electronic components on the circuit board 116 is still more efficiently dissipated to the frame 126. The frame 126 may then be cooled by the ambient air and/or through contact with the structure 102.

To further enhance heat dissipation through the frame 126, the frame 126 may be corrugated containing alternating ridges 128 and troughs 130. The ridges 128 and troughs 130 are relative terminologies depending on how the frame 126 is viewed. For the sake of clarity and ease of discussion, ridges 128 and troughs 130 will be referred to while looking towards the frame 126 as it is mounted on the structure 102.

Figure 2:
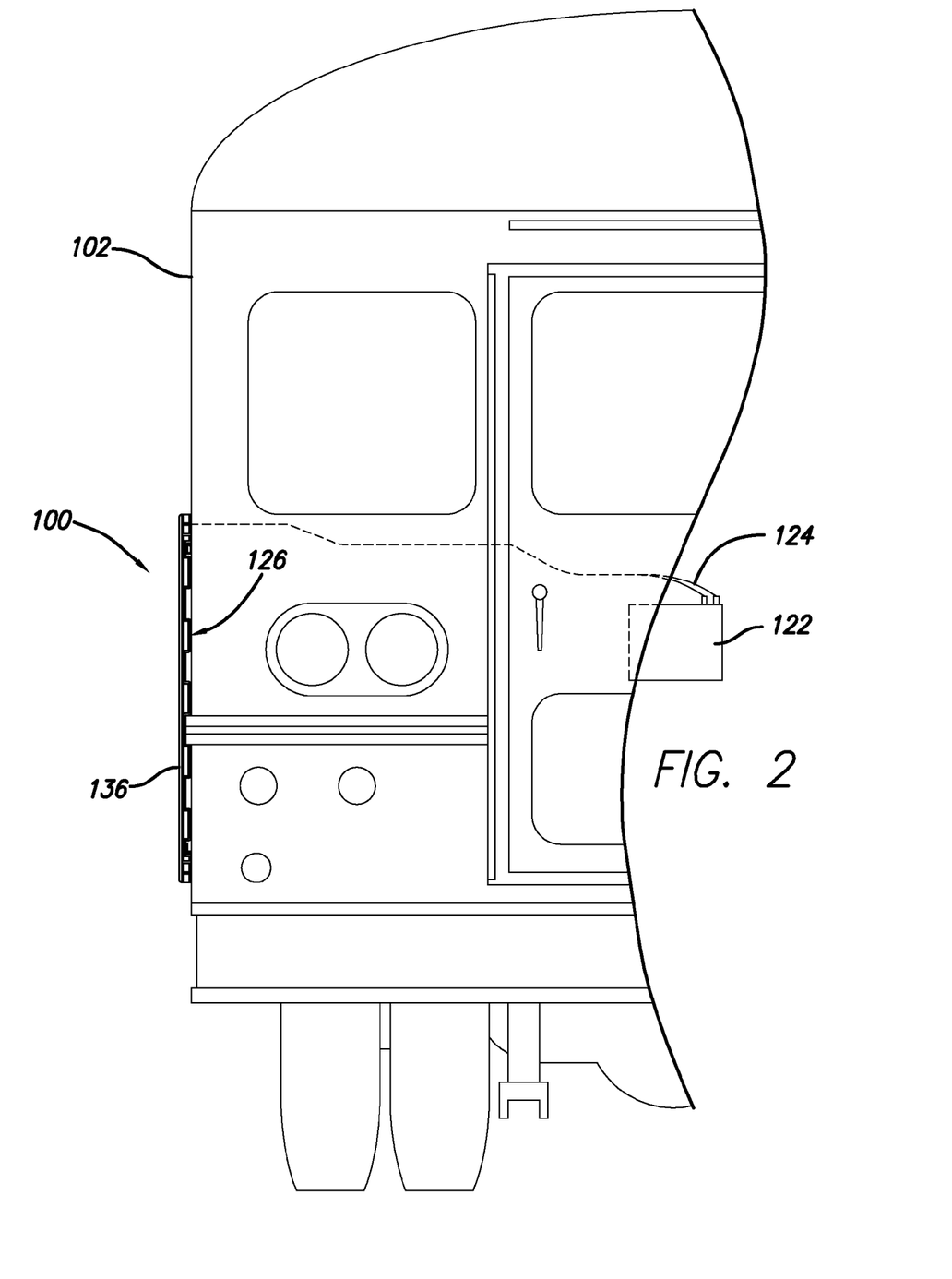
FIG. 2 shows a side view of an embodiment of the multi-panel electronic display attached to a bus.
Figure 3:
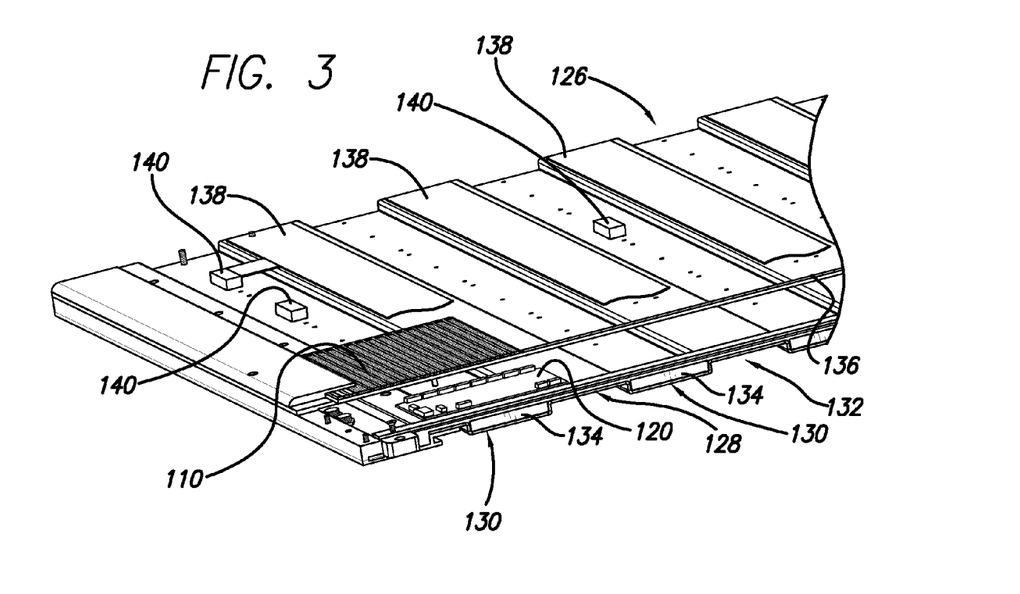
FIG. 3 shows a partial perspective view of the multi-panel electronic display partially assembled.

The ridges 128 provide the support upon which the panels 110 are mounted. In addition, the ridges 128 serve as heat sinks to remove heat from the heat-generating components 142-150. Behind the ridges 128 are provided channels 132 through which air can flow to increase the dissipation of heat from the electronic components that have been transferred to the ridges 128. The channels 132 may be oriented horizontally, as illustrated in FIG. 2, so that horizontal airflow, such as that created by a moving vehicle or the wind, is directed through the channels 132, thereby cooling the ridges 128.

Other configurations are equally contemplated, including a vertically oriented ridges 128 and channels 132, or various waffle-shaped or checkerboard-shaped patterns. Such alternative patterns can produce superior heat dissipating characteristics depending on the desired use of the display, such as on a static structure 102 versus moving vehicle 102 or on a slow moving vehicle versus fast moving vehicle. In some embodiments, the channels 132 may be oriented vertically. Under conditions where there is no significant outside airflow, hot air created in such vertically oriented channels 132 can produce an airflow through the channels 132. Under conditions where there is significant outside airflow, the Bernoulli principle can create an airflow within such vertically oriented channels 132. A waffle-shaped pattern or a checkerboard-shaped pattern can take advantage of airflows in both the vertical and horizontal channels 132 under many such circumstances.

Heat absorbed by the ridges 128 is also transferred to the troughs 130 through conduction. The heat transferred to the troughs 130 is then dissipated by conduction through contact with the structure 102. To protect the electronic component from direct exposure to the environment, end caps 134 may be placed inside the troughs 130.

The troughs 130 also provide additional space through which wiring for the electronic components can be routed.

The frame 126 may be removably mountable to the structure 102 using hanging rail in order to facilitate mounting on a wide variety of structures, selecting where to place any necessary holes in the structure for mounting purposes and thereby minimizing the number of new holes that may be necessary to punch in the wall of the structure. Also, such a hanging rail configuration also makes removal much easier as well. Alternatively, there are many other types of quick-releasing fasteners that are equally contemplated in by this invention so that the display can be easily removed to be repaired, exchanged, or transferred to another structure. Having the electronic components attached to the panels 110 and the frame 126 also facilitates easy removal and replacement of any malfunctioning circuit board and display panel without having to enter the structure or vehicle 102 because the circuit boards have been move outside the structure 102.

In some embodiments, the frame 126 may be fixedly mounted to the structure 102 to reduce the chance of having the multi-panel display 100 tampered with or stolen. Since each panel 110 is a modular device, repair, replacement, or removal is made easy as each panel 110 can be individually removed and replaced with another panel 110 like a plug-in device.

Another benefit from this configuration is that the display may be more easily sealed off from the surrounding environment resulting in a fully contained and tightly sealed transportable product. A transparent cover 136 can be mounted in front of the multi-panel display and sealed along all four edges by a casing that is attached to the frame 126. In this configuration, the cover 136 would seal the front surfaces 112 of the display panels 110. This cover may also serve to further prevent tampering or damage to the display panels, as well as optionally to improve the display characteristics of the display 100, the multi-panel display may be covered with a transparent cover 136. In conjunction with cover 136, end caps 134 operate to seal off the backs 114 of the display panels from the surrounding environment. As a result both the front and back surfaces of the display may be tightly sealed, including the voltage converters 142 and regulators 144, and the other electronic components 146-150 so that no outside air or moisture reaches these components or either surface of the display panels 110.

To further improve the heat sinking function of the frame 126, thermally conductive pads 138 may be placed between the heat-generating components 142-150 and the corrugated frame 126. In some embodiments, the thermally conductive pads 138 may be placed behind the frame 126 or in between the frame 126 and the structure 102. Preferably, the thermally conductive pad 138 is made of soft, compressible material having high thermal conductivity. This allows the thermally conductive pad 138 to be easily installed and effective at contacting a significant amount of the heated surfaces of the heat-generating components 142-150 as well as a significant amount of the available adjacent surfaces of the frame 126. An example of a thermally conductive pad 138 is the thermal gap filler products manufactured by Laird Technologies®.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

INDUSTRIAL APPLICABILITY

This invention may be industrially applied to the development, manufacture, and use of an electronic display 100 that utilizes the naturally encountered airflow to cool the electronic components in which the heat-generating components are distributed our a greater area of the support frame that is used as a heat sink. The electronic display 100 comprises a frame 126 removably attached to the structure 102 in such a way as to encounter a natural airflow, a plurality of individual panels 110 mounted on the frame 126, each panel 110 comprising a first side 112 and a second side 114 opposite the first side 112, the first side 112 comprising a plurality of light sources 104, wherein each individual panel 110 works with other individual panels 110 to display an image, and a circuit board 116 attached to the side of more than one of the individual panels 110 of the multi-panel electronic display 100 and in thermally conductive communication with the frame 126 such that heat generated by electronic components on the circuit board 116 is dissipated within the frame 126 and such that the frame 126 is cooled by the natural airflow.

What is claimed is:

1. A method for dissipating heat generated by a multi-panel electronic display for use on a structure comprising:
    a. distributing a plurality of heat-generating electronic components over a plurality of the individual panels of the multi-panel electronic display, said heat-generating components being selected from a group consisting of voltage converters and voltage regulators,
    b. mounting the multi-panel electronic display on a frame,
    c. thermally connecting the heat-generating components to the frame so that a majority of the heat the heat-generating components generate when the display is in use is conducted to the frame, said frame having a dimension, shape, and orientation to maximize convection cooling by air passing by the frame,
    d. removably mounting the frame to the structure, and
    e. connecting a power source to the plurality of heat-generating electronic components to operate electronic display.

2. The method of claim 1, wherein the plurality of heat-generating components comprises a plurality of voltage converters and a plurality of voltage regulators.

3. The method of claim 2, wherein the plurality of voltage converters convert the voltage supplied by the power source to the voltage needed to operate the individual panels of the electronic display.

4. The method of claim 1 wherein the heat-generating electronic components are contained within the electronic display and are sealed off from the environment and also are not exposed to any forced air ventilation, but instead are cooled primarily by conduction of the generated heat to the frame.

5. The method of claim 1, further comprising forming the frame into a corrugated, waffle, or checkerboard pattern to optimize its capacity to draw heat away from the heat-generating electronic components and its capacity to promote convection cooling by the air passing by the frame.

6. The method of claim 1 further comprising situating thermally conductive pads between the heat-generating components and the frame to further facilitate heat dissipation by the frame.

7. The method of claim 1 further comprising delivering more than 5 volts of electricity directly to each of the individual panels and converting this voltage at the point of the panels themselves down to the voltage useable by the panels, said voltage conversion at the point of the panels themselves being for the purpose of facilitating the overall heat distribution and removal.

8. The method of claim 1 further comprising orienting the frame to maximize natural airflow created by the heat differential between air heated by the frame and the ambient air to further facilitate heat dissipation.

9. The method of claim 1, further comprising moving the structure, orienting the display on the side of the moving structure, and orienting the frame to maximize the exposure of the frame to additional airflow created along the side of the moving structure.

10. A method for promoting efficient heat dissipation in a multi-panel electronic display for use on a structure, comprising:
    a. providing a plurality of electronic display panels each working in conjunction with other of said electronic display panels to display an image and mounted on a frame,
    b. providing a plurality of printed circuit boards on the backs of two or more of the plurality of electronic display panels each having one or more resident heat-generating electronic components selected from a group consisting of voltage converters and voltage regulators,
    c. sealing off the heat-generating electronic components from the environment and not exposing them to any forced air ventilation so that the heat-generating electronic components will be cooled principally by conduction of the generated heat to the frame where the air passing by the frame will remove the heat from the frame,
    d. removably attaching the frame to the structure, and
    e. supplying each printed circuit board with more than 5 volts of potential from a power source.

11. The method of claim 10, further comprising forming the frame into a corrugated, waffle, or checkerboard pattern to optimize its capacity to draw heat away from the heat-generating electronic components.

12. The method of claim 10 further comprising further facilitating heat dissipation by using thermally conductive pads between the heat generating components and the frame.

13. The method of claim 10, further comprising further facilitating heat dissipation by moving the structure and orienting the display on the side of the moving structure so that the frame encounters additional airflow from the ambient environment.

14. A multi-panel electronic display for use on a structure, comprising:
    a. a frame removably attached to the structure and shaped, dimensioned, and oriented in such a way as to maximize airflow passing therethrough,
    b. a plurality of individual panels mounted on the frame, each panel comprising a first side and a second side opposite the first side, the first side comprising a plurality of light sources, wherein the light sources of each individual panel works with the light sources of other individual panels to display an aggregate image, and
    c. a circuit board attached to the second side of more than one of the individual panels of the multi-panel electronic display and comprising a voltage converter and a voltage regulator for converting and regulating the voltage to be used by the individual panels of the electronic display, wherein the voltage converter and voltage regulator are sealed off from the environment and in thermally conductive communication with the frame such that heat generated by the voltage converter and voltage regulator is conducted to the frame and such that the frame is cooled by the natural airflow passing therethrough.

15. The display of claim 14, wherein the frame is corrugated.

16. The display of claim 14 further comprising a data distribution board to coordinate selective activation of the light sources to display an image.

17. The display of claim 14 further comprising one or more thermally conductive pads situated between the electronic components of the circuit board and the frame to facilitate dissipation of heat generated by the components.

18. The display of claim 14 further comprising one or more thermally conductive pads situated between the frame and the structure to facilitate dissipation of heat generated by the components.

19. The display of claim 14 further comprising a power source in excess of 5 volts potential in direct electrical communication to each of the circuit boards.

20. The display of claim 19, wherein the power source has a potential of at least approximately 12 volts.

21. The display of claim 19, wherein the power source has a potential of at least approximately 24 volts.

* * * * *